United States Patent
Ristow et al.

[11] Patent Number: 6,031,622
[45] Date of Patent: Feb. 29, 2000

[54] METHOD AND APPARATUS FOR FONT COMPRESSION AND DECOMPRESSION

[75] Inventors: Allan W. Ristow, Salem; Sampo J. Kaasila, Plaistow, both of N.H.

[73] Assignee: Agfa Corporation, Wilmington, Mass.

[21] Appl. No.: 08/852,768

[22] Filed: May 7, 1997

Related U.S. Application Data

[60] Provisional application No. 60/017,169, May 16, 1996.

[51] Int. Cl.[7] .................................................. G06K 15/00
[52] U.S. Cl. ......................................... 358/1.11; 358/1.16
[58] Field of Search ..................... 358/1.11, 1.15, 358/1.16, 11.1, 470, 426; 345/202, 467, 468, 470, 471, 203, 511, 194, 192; 382/232, 233, 235

[56] References Cited

U.S. PATENT DOCUMENTS

| | | | |
|---|---|---|---|
| 4,971,407 | 11/1990 | Hoffman | 341/87 |
| 5,577,183 | 11/1996 | Weyand | 395/114 |
| 5,734,388 | 3/1998 | Ristow et al. | |

FOREIGN PATENT DOCUMENTS

| | | |
|---|---|---|
| 0357383 | 3/1990 | European Pat. Off. . |
| 0357389 | 3/1990 | European Pat. Off. . |
| 0673122 | 9/1995 | European Pat. Off. . |
| 0684582 | 11/1995 | European Pat. Off. . |

*Primary Examiner*—Arthur G. Evans
*Attorney, Agent, or Firm*—Robert A. Sabourin; Richard J. Birch

[57] ABSTRACT

A font compression method and apparatus operates by: compressing different components of a font file with separate compressors having varying compression schemes to produce a plurality of intermediate compressed data sets; separating compressed glyph table components of the font file into different ones of the intermediate compressed data sets; and further compressing the intermediate compressed data sets to produce corresponding compressed output data sets. A corresponding decompression method and apparatus is used to decompress fonts which have been compressed using the above method.

25 Claims, 4 Drawing Sheets

METHOD AND APPARATUS FOR FONT COMPRESSION AND DECOMPRESSION

CROSS-REFERENCE TO RELATED APPLICATION

The application claims the benefit of U.S. Provisional Application No. 60/017,169 filed May 16, 1996.

BACKGROUND OF THE INVENTION

1. Field of Invention

The present invention relates to font compression and decompression and has particular application to TrueType fonts.

2. Description of Related Art Including Information Disclosed Under 37 CFR 1.97 and 1.98

*The Data Compression Book*, (2nd Edition, by Mark Nelson & Jean-Louis Gailly, ISBN 1-55851-434-1;

[ZIV77] ZIV], Lempel A, "A Universal Algorithm For Sequential Data Compression", IEEE Transactions on Information Theory, Vol. 23, No. 3, pp. 337–343.

BRIEF SUMMARY OF THE INVENTION

A font compression method and apparatus operates by: compressing different components of a font file with separate compressors having varying compression schemes to produce a plurality of intermediate compressed data sets; separating compressed glyph table components of the font file into different ones of the intermediate compressed data sets; and further compressing the intermediate compressed data sets to produce corresponding compressed output data sets. A corresponding decompression method and apparatus is used to decompress fonts which have been compressed using the above method.

DESCRIPTION OF THE PREFERRED EMBODIMENT

Figure 1:
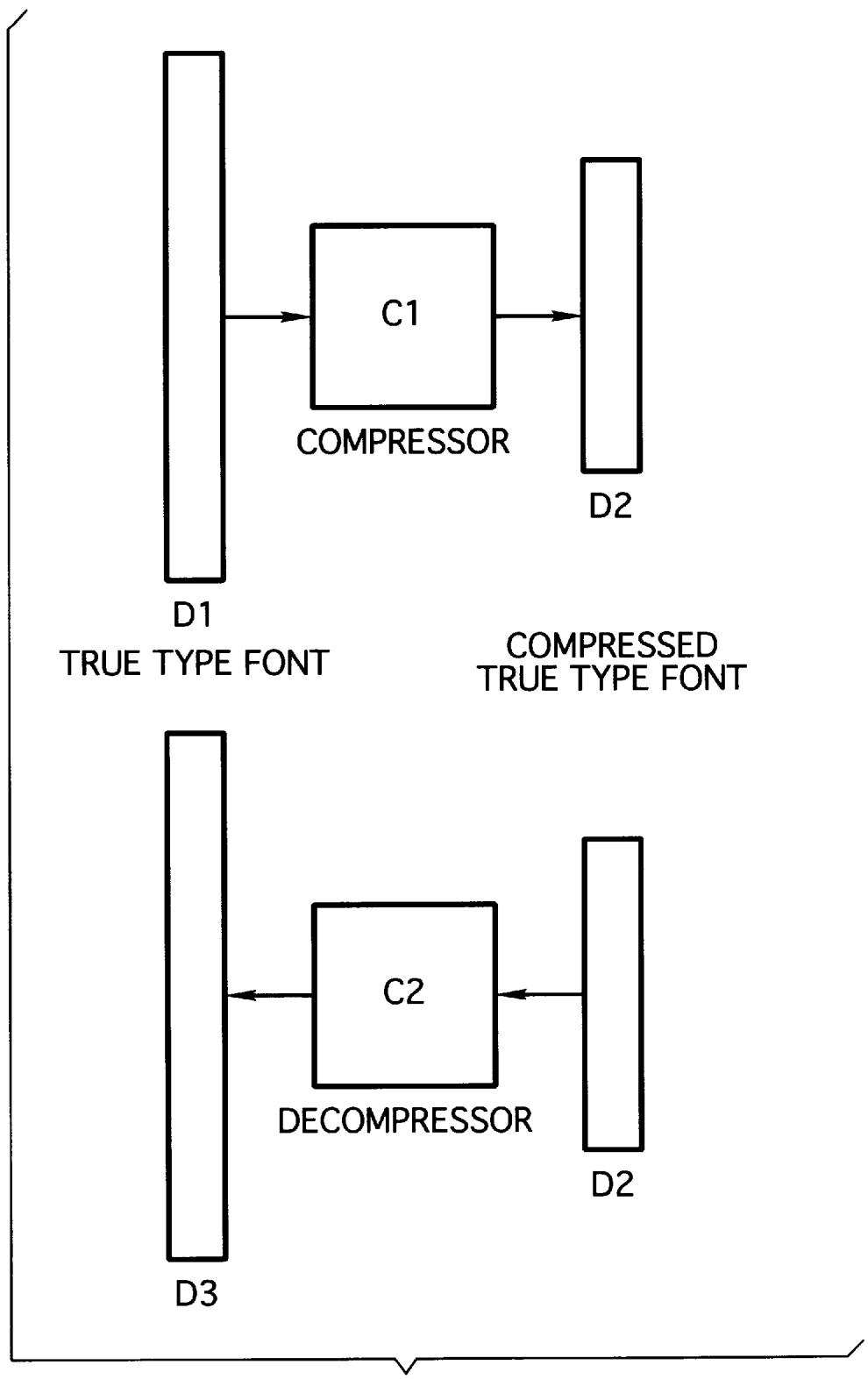
FIG. 1 is a top level block diagram showing the compression and decompression process and the associated data files.

Turning now to the drawings, FIG. 1 is a top level block diagram showing the compression and decompression process and the associated data files. An exemplar TrueType font file D1 is input to a compression mechanism C1 which produces a compressed data font file D2 representative of the TrueType font file D1.

The compressed file is typically transmitted either electronically over a digital network or via a storage medium like diskettes. A decompressor C2 takes as input the compressed data file D2 and produces a TrueType font file D3. The file D3 is not necessarily identical to the file D1. The two files are, however, functionally equivalent in that they behave identically as TrueType fonts. The differences between the D1 and D3 will be explained below in connection with the more detailed levels.

Figure 2:
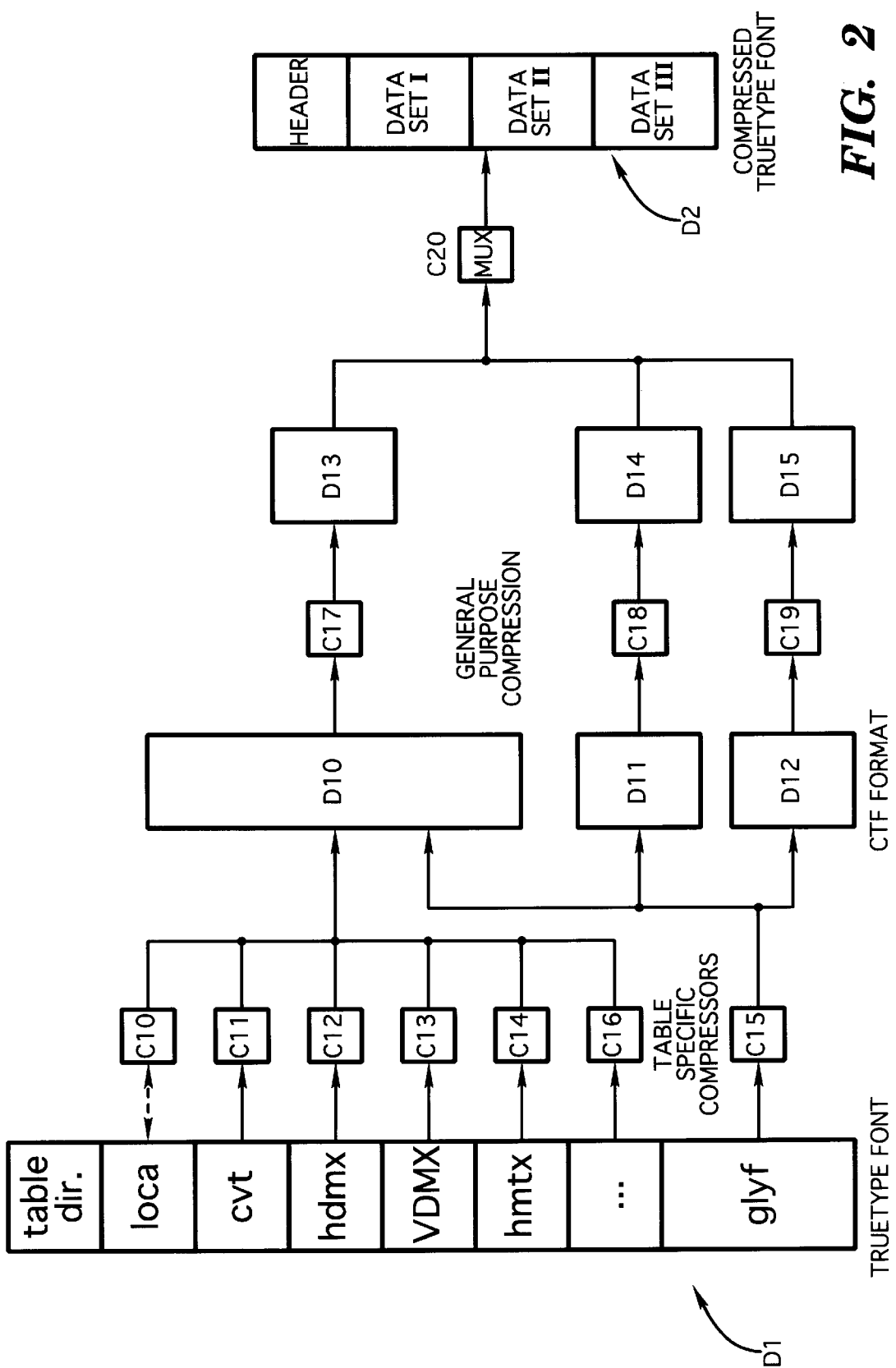
FIG. 2 is a more detailed block diagram of the compressors and associated data files for a TrueType font consisting of a collection of tables and a directory of these tables.

FIG. 2 is a more detailed view of the compressor and associated data files. The TrueType font D1 consists of a collection of tables and a directory of these tables. The TrueType font format which is abbreviated hereinafter as "TTF" is defined in "TrueType 1.0 Font Files Technical Specification", Revision 1.66, August 1995,. Microsoft Corporation, incorporated herein by reference. The font directory together with all of the tables are first converted by compressors C10 through C17 into an intermediate form called compressed TrueType font, or "CTF" format. The CTF data is identified as D10, D11, and D12.

The 3 data sets are:

D11 "data": all the data from the initial push bursts for each glyph

D12 "code": all the TrueType instructions for all the glyphs minus the initial push burst sequence concatenated together.

D10 "rest": Everything else goes here.

The three sections D10, D11 and D12 of the CTF data are then further compressed in a second step using three compressors C17, C18, and C19 which can be the same or different generic compressors. Preferably, C17, C18 and C19 are three instances of LZCOMP, a loss-less data compressor which produces three compressed data sets D13, D14, and D15. These three data sets are then preferably merged by compressor C20 into a single output file D2 for packaging convenience.

The fact that the data is separated into three sets, all with different statistical distributions, results in a smaller total size since LZCOMP compresses each set independently of the other, and therefore, LZCOMP can adapt to the particular distinctly different statistical data distribution for each different data set. This technique results in a more compact final result when the CTF format is further compressed by LZCOMP.

The TTF to CTF translation can eliminate glyphs that are not needed. This is called character subsetting. The actual glyph outlines and instructions in the 'glyph' table are deleted and replaced with a null glyph. For the hmtx and hdmx tables the values for the deleted glyphs are set to zero. This results in a smaller final file size.

TTF to CTF file translation techniques

The goal for the TTF_Converter class is to create a more compact file without losing any information. Another goal is that the output should be suitable for compression by traditional compression methods (e.g., LZCOMP). This basically means that data mostly needs to be byte aligned, unless there is a huge win in going to the bit-level.

The table directory and the tables loca, cvt, hdmx, VDMX, hmtx, and glyph are compressed by compressors C10 through C15. All of the other tables in the TrueType font file are passed through C16 which simply copies the tables into D10. The hdmx and VDMX tables are kept bit aligned while the other tables remain byte aligned.

The Table Directory

The font table directory has the same format in both the CTF and TTF files.

Loca Table

The TrueType 'loca' table contains information regarding the specific location of each glyph in the 'glyph' table, and implicitly also the length of each glyph in the 'glyph' table. The glyphs are accessed in sequence. The length of each glyph is already implicitly defined by the data for that glyph.

Since the glyphs are stored in sequence in the 'glyph' table starting at offset zero, there is no need to store the 'loca' table in the CTF format. When the information is translated back to the TTF format, the 'loca' table is recreated from the available information, which is sufficient for this task. The elimination of the 'loca' table results in a more compact CTF format. However, many compression benefits can be achieved even if the 'loca' table is retained and compressed as shown by the dashed line in FIG. 2.

Cvt Table

The contents of the cvt table in a TrueType font consists of a sequence of signed 16 bit 2's complement integers. The CTF format stores the values relative to the previous value modulo 2 raised to 16. The first value is stored relative to zero. Sometimes numerically close values are stored next to each other in the Cvt, and this technique will cause them to be stored as numerically small relative values instead. In this situation, the relative values are stored with the following technique: Each value is encoded in 1 to 3 bytes, so that most values can be stored as one, or two bytes instead of 2. In this encoded format, each byte is treated as an unsigned byte in the range 0 . . . 255 inclusive. If the byte is in the range 248 . . . 255 inclusive, then this byte is called b1, and then another byte is read as b2. The value in this case is defined as equal to 238*(b1−247)+b2. Thus, one can encode values in the range 238 . . . 2159 inclusive in two bytes. If the byte is in the range 239 . . . 247 inclusive, then it is called byte b1, and then another byte is read as b2. The value in this case is defined as equal to −(238*(b1−239)+b2). Thus, one can encode values in the range −0 to −2159 inclusive in two bytes. If the byte is equal to 238, 2 more bytes are read and the value is treated as a signed 2 byte quantity, based on the last two read bytes. The value is equal to this quantity. Thus, one can encode large values in 3 bytes. However, if the byte is less than 238, the value equal to the byte is set without reading any more bytes thereby encoding 0.237 inclusive in one byte. This technique results in a more compact CTF format since the typical statistical distribution of the data values allows storage of a majority of the values as single or double bytes.

Hdmx Table

The 'hdmx' table in TrueType contain the device advance widths of the glyphs for a range of sizes. TrueType instructions can change the device advance width in a non-linear manner and therefore they are stored in the TrueType file so that the client of the TrueType rasterizer can quickly obtain access to the widths of characters without actually rendering them.

In translating to CTF format, the most likely device advance width is predicted. The most likely value is the device independent advance width linearly scaled to the particular device resolutions, and size, and then rounded to the closest integer. This prediction is always very close to the truth. Therefore, one can treat the difference between the actual device advance width and the prediction as the surprise. This method only stores the surprise value which is typically equal to zero or very small with the "Magnitude dependent variable size encoding" described below. When the TTF file is reconstructed from the CTF file, the prediction is simply made and then the surprise is added to the prediction to get the actual true value. This technique results in a more compact CTF format.

"Magnitude dependent variable size encoding" of a value is used in the encoding of the 'hdmx' and 'VDMX' table.

A value of 0 is encoded as a 0 bit.
A value of +1 is encoded as the 100 bits.
A value of −1 is encoded as the 101 bits.
A value of +2 is encoded as the 1100 bits.
A value of −2 is encoded as the 1101 bits.
A value of +3 is encoded as the 11100 bits.
A value of −3 is encoded as the 11101 bits.
etc . . .

The absolute of the value is equal to the number of 1's preceding the '0'. Then if the value is greater than zero there is one additional sign bit, where '0' represents '+' and '1' represents '−'. This means that one obtains a variable bit length encoding of values, where the number of bits used grows with the magnitude of the value. This encoding can be used advantageously for storing very small values.

VDMX Table

The 'VDMX' table contains the maximum font wide maximum and minimum y value for a range of sizes and aspect ratios. Similarly to the 'hdmx' table, the values are predicted and then only the surprise is encoded which is equal to the error in the prediction with the "Magnitude dependent variable size encoding" described above. The following technique is used to predict the 3 values (ppem (size), ymax, ymin) The predicted ppem is simply the previous ppem+one. The predicted ymax is equal to size*yMaxMultiplier rounded to the closest pixel. The predicted ymin is equal to size*yMinMultiplier rounded to the closest pixel. The yMaxMultiplier and yMinMultiplier are simply computed as the average of the exact multipliers for each instance during the TTF to CTF file translation. These two average values are then stored in the file, so that the actual ymax and ymin values can be predicted with the previously mentioned formula.

Glyph Table

The 'glyph' table contains the individual scalable characters in the font. These characters are stored within the table sequentially and are indexed by entries in the 'loca' table. Module C15 compresses the 'glyph' table into CTF format producing data files D11 and D12. Within C15, each character in the 'glyph' table is compressed as shown in FIG. 3.

Figure 3:
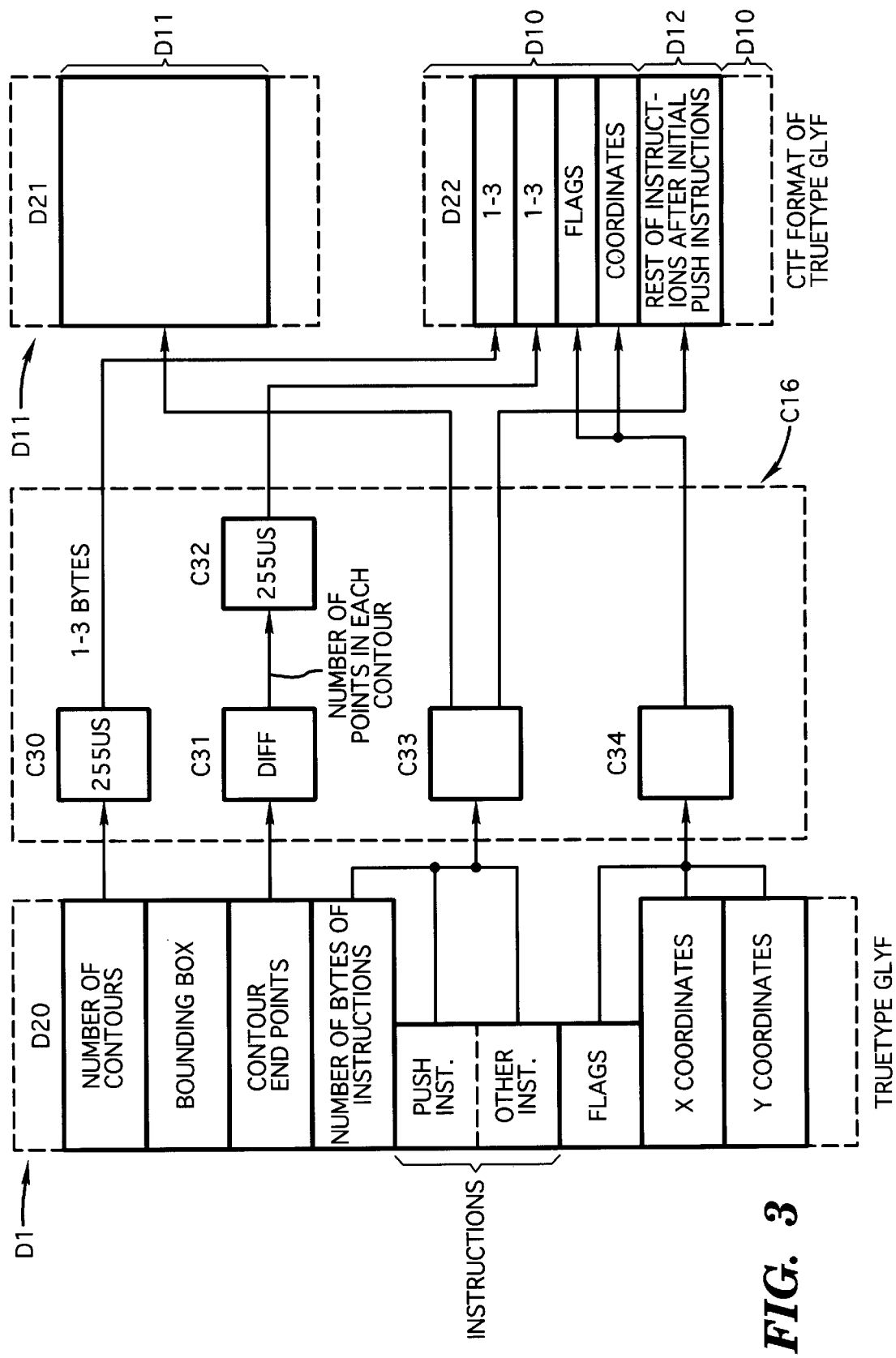
FIG. 3 illustrates in block form an individual TrueType character, individual compression modules and the resulting intermediate compressed TrueType font; and, FIG. 4 is a block diagram illustrating the application of the present invention to a network or communications channel configuration.

FIG. 3 depicts an individual TrueType character D20, the individual compression modules C30 through C34 and resulting compressed character data in CTF format D21 and D22. These two data blocks are stored sequentially, character by character, within D11 and D12. Composite characters are stored in native TrueType format, however, non-composite glyphs are stored more compactly.

Number of Contours

The number of contours is a 16 bit integer that is stored as a signed 2 byte quantity.

Bounding Box

Each glyph in the 'glyph' table contains the bounding box for that character. It is stored as 4*2 bytes of data. The bounding box is a direct function of the coordinate data for each glyph. Since the coordinate data for each glyph is stored, this directly specifies the bounding box and there is no need to explicitly store the bounding box. In the CTF file format, the bounding box is not stored for regular glyphs. The bounding box is simply recomputed during translation back to the TTF format. This technique results in a more compact CTF format. 255UShort format encoding is effective for small positive values. Each value is encoded in 1 to 3 bytes, so that most small positive values can be stored as one byte instead of 2. In this encoded format each byte is treated as an unsigned byte in the range 0 . . . 255 inclusive. If the byte is equal to 253, 2 more bytes are read and the value is treated as a signed 2 byte quantity, bases on the last two read bytes. The value is equal to this quantity. Thus large values are encoded in 3 bytes. If the byte is equal to 255, then this byte is called b1, and then another byte is read as b2. The value in this case is defined as (253+b2). Thus values in the range 253 to 505 inclusive are encoded in two bytes.

If the byte is equal to 254, it is called byte b1, and then another byte is read as b2. The value in this case is defined as (2*253+b2). Thus values in the range 506 to 758 inclusive are encoded in two bytes.

However, if the byte is less than 253 it is interpreted as the magnitude of the value. Thus values in the range 0 to 252 inclusive are encoded in one byte. This technique results in a more compact CTF format, since it is used where the typical statistical distribution of the data values permits storage of a majority of the values as single bytes, instead of double bytes as in the TrueType format.

Contour End Points

Instead of storing the actual endpoint numbers as TrueType does, only the difference between the current endpoint and the previous endpoint is stored. The "previous end point" for contour zero is set to zero by definition. During translation back to TTF from the CTF format, the endpoint value for each contour is simply set equal to the cumulative sum of the stored values in the contours so far. This technique results in sequence of small positive numbers. Each value is encoded in 1 to 3 bytes, so that most values can be stored as one byte instead of 2, with the "255UShort format encoding" mentioned above. This technique results in a more compact CTF format, since the typical statistical distribution of the data values allows storage of a majority of the values as single bytes, instead of double bytes as in the TrueType format. If the first contour has two points, the process is started by storing a one.

Instructions

TrueType contains four instructions for pushing data onto the stack. These four instructions occupy 18 opcodes out of at most 256 possibilities in byte encoded TrueType instruction language. Glyph programs for TrueType glyphs typically start with a burst of various PUSH instructions aimed at setting up the initial stack for the TrueType instructions belonging to that glyph. The fact that this PUSH burst sequence is typical and only 18 out of 256 codes are used leaves room for improvement. Storage is used for how many values are pushed and the actual values independent of the TrueType opcodes used to push them onto the stack. These values are collectively known as "an initial state of the stack". During translation back to TrueType new TrueType instructions for pushing the values onto the initial stack are simply generated. This technique results in a more compact CTF format.

The storage of the initial push data for the stack is as follows. "255UShort format encoding" is used to encode the number of values pushed onto the initial stack as well as the number of remaining instruction bytes after the pushes. Each data value is in the range −32768 and 32767 inclusive. Most of these values are small positive numbers. Each value is encoded in 1 to 3 bytes (or less), so that most values can be stored in two or less bytes instead of 2 bytes. In this encoded format, each byte is treated as an unsigned byte in the range 0 . . . 255 inclusive. If the byte is equal to 251, then it is treated as a Hop3Code command. This command causes a read of only one value, according to this specified technique, but without further Hop3 or Hop4 commands. The command then sets 3 values. The first value is set equal to the value 2 indices back into the stream and is called value A. Then the next value is set equal to the value read with this technique, and then the third value is set equal to A again. Hop3Code does the following transformation going from TTF to CTF and then back to TTF:

$$A,X1,A,X2,A \rightarrow A,X1,\text{Hop3Code},X2 \rightarrow A,X1,A,X2,A$$

If the byte is equal to 252, it is treated as a Hop4Code command. This command reads only two values, according to this specified technique, but without further Hop3 or Hop4 commands. The command then sets 5 values. The first value is set equal to the value 2 indices back into the stream and is called value A. Then the next value is set equal to the first value read with this technique, and then the third value is set equal to A again. The fourth value is set equal to the 2nd value read with this technique. Finally the fifth value is set equal to A again. Hop4Code does the following transformation going from TTF to CTF and then back to TTF:

$$A,X1,A,X2,A,X3,A \rightarrow A,X1,\text{Hop4Code},X2,X3 \rightarrow A,X1,A,X2,A,X3,A$$

When encoding the data one first determines if any values can be encoded with the Hop3 or Hop4 commands, thereafter all remaining values are encoded in the 255Short format.

In the 255Short format, values in the range 0 . . . 249 inclusive are encoded as the value itself expressed as one byte. Values in the range 250 . . . 499 inclusive are encoded as a byte with value 255 followed by a second byte containing the value minus 250.

Values in the range 500 . . . 749 inclusive are encoded as a byte with value 254 followed by a second byte containing the value minus 500.

Values in the range −1 . . . −249 inclusive are encoded as a byte with value 250 followed by a second byte containing the absolute of the value.

Values greater than 749 and values less than −249 are encoded as a byte with value 253 followed by two bytes containing the value directly.

Thus values in the range 0 . . . 249 inclusive are encoded with one byte while values in the following inclusive ranges −1 . . . −249, 250 . . . 499, 500 . . . 749 are encoded with two bytes. Everything else is encoded with 3 bytes.

This technique results in a more compact CTF format since the typical statistical distribution of the data values allow storage of a majority of the values as single or double bytes, or even less when the Hop3Code or Hop4Code commands are used.

Character Outline

A more compact format for storing the outlines in the 'glyph' table is utilized. The TrueType format stores the coordinate data in a sub-optimal format, leaving room for optimization, so that in the CTF format the coordinates are stored using less bits per {dx, dy, on/off-curve} triplet. Each triplet is stored with a variable length encoding which consumes 2 to 5 bytes per triplet. One bit of the first byte is used to indicate whether the point is an "on" or "off"-curve point. Thus there are 128 remaining combinations for the first byte. All 128 remaining combinations have a precisely defined meaning. They specify the following seven properties:

(a) Total number of bytes used for this triplet. (2–5)

(b) Number of additional bits beyond the first byte used for describing the dx value.

(c) Number of additional bits beyond the first byte used for describing the dy value.

(d) An additional amount to add to the dx value described by data beyond the first byte.

(e) An additional amount to add to the dy value described by data beyond the first byte.

(f) The sign of the dx value. (This has no meaning if the value of dx is zero, which is specified by 0 xbits).

(g) The sign of the dy value. (This has no meaning if the value of dy is zero, which is specified by 0 ybits).

Each of the 128 combinations has a unique combination of these 7 properties. The properties are assigned so that with the typical statistical distribution of data found in TrueType files the resulting data size in the CTF format is much reduced compared to the less efficient native TrueType format. The data is still left byte aligned so that LZCOMP in the 2nd stage can further compress the data. This technique results in a more compact CTF format.

LZCOMP

The LZCOMP compression algorithm is a variation on the LZ77 theme.

An excellent starting point for data compression information is the 2nd edition of [Nelson95] "The Data Compression Book" by Mark Nelson. ISBN 1-55851-434-1.

An unmodified LZ77 algorithm encodes the data to be compressed into tokens. Each token consists of:

(1) An offset to the start of the string to be copied.
(2) The length of the string
(3) The first character in the Look-Ahead buffer that follows the string. [Ziv77] Ziv J., "A universal Algorithm for Sequential Data Compression", IEEE Transactions on Information Theory, Vol. 23, No 3, pp 337–343, incorporated herein by reference.

LZCOMP differs from LZ77 as follows:

(1) LZ77 always transmits a triplet (0,0,c) for a character not matched. Instead literals (characters not matched) and copy items (string matches) can be outputted in any sequence and order.

(2) Some predefined constant data is concatenated in front of the history buffer, so that there is a possibility that copy items may be used even at the beginning of the data. This idea is mentioned in Nelson95.

(3) Adaptive Huffman encoding is employed to further enhance the compression. Three separate Adaptive Huffman trees are employed with the trees encoding everything, including the offset amount, string length, and copy commands.

(4) 3 single byte copy commands are used. (This is helpful but not necessarily in the general case)

(5) The distance to the tail of the string is encoded but not the head as in LZ77. This way one can reach a greater distance.

(6) LZ77 only provides a small window into the previously seen text. LZCOMP can address all of the previously seen text.

(7) LZ77 limits the length of the phrase that can be matched. LZCOMP has no such limit on the phrase length.

(8) A variable minimum copy length is used. If the offset is greater or equal to 512 bytes the minimum phrase length is 3 bytes, otherwise it is 2 bytes.

(9) The compression code communicates with the entropy based encoders so that it knows the exact cost of various decisions. With this information it makes an optimal choice. This item (10) is highly related to item 11. This communication enables one to make a better choice than a normal "greedy" algorithm would.

(10) LZ77 is greedy; LZCOMP is a little better, because all of the following are considered:

(a) the "best" copy item for the current position.
(b) using a literal instead of the "best" copy item.
(c) cutting back the length of the "best" copy item by one byte.
(d) If the length of the copy item is just two, then a combination of a copy item and literal item is also considered.

(11) The encoding scheme is so compact that one can advantageously have copy lengths as short as two bytes in the general case.

LZCOMP Decompression

The LZCOMP decompression steps follow. Everything is stored as a sequence of symbols. The symbols are encoded with a plain Adaptive Huffman encoding tree (AHUFF #1). (For an explanation of Adaptive Huffman see [Nelson95].) The sequence of symbols is read one at a time until the input data is exhausted.

(1) If the symbol value is less than 256 then it is interpreted as literal byte and the value is copied directly into the output stream.

(2) If the symbol is equal to DUP2 then it is interpreted as a single byte copy item from 2 bytes backwards. If the symbol is equal to DUP4 then it is interpreted as a single byte copy item from 4 bytes backwards. If the symbol is equal to DUP6 then it is interpreted as a single byte copy item from 6 bytes backwards.

(3) However if the symbol is greater than 255 and it is not equal to DUP2, DUP4 or DUP6 then it is interpreted as a copy command. This first copy command value encodes the number of distance symbols used for this copy item. The number of distance symbols used is equal to (symbol value−256)/8+1.

Additionally, this first copy command value encodes the first range for the length. The first range for the length is (symbol value−256) % 8. This is a 3 bit quantity. The length is first initialized to zero, then shift in the 2 least significant bits from the 3 bit quantity. The most significant of the 3 bits is treated as a stop bit. If it is set then the process is finished.

However, there is continued reading of symbols through a separate Adaptive Huffman tree (AHUFF #2). These new symbols all have a value between 0 and 7. Now one keeps shifting in the 2 lowest bits, including the 2 lowest bits in the symbol that has the stop bit set. Then when done, the minimum length (+=2) is added to the length. Next a sequence of symbols is read in through a third Adaptive Huffman tree (AHUFF #3). This sequence encodes the offset value. One already knows how many symbols to read in since this was encoded in the initial symbol. This means one does not have to rely on stop-bits. Each symbol is 3 bits wide, and one simply reads the right number of them and concatenates them all together. Now add 1 to this concatenated value and the resulting value forms the offset. Additionally, once the offset has been decoded and if it is greater than or equal to the maximum 2 byte copy offset (512), then one is added to the length since the minimum copy length jumps from 2 to 3 bytes at the 512 byte boundary.

LZCOMP Compression

The compressor simply sits in a loop and for each byte or string decides exactly which one of the 3 possible actions to take:

(1) Literal byte.

(2) Single byte copy command. If it is possible to use a single byte copy command the code always gives preference to this option over the literal byte option. This is advantageous for the kind of data present in the CTF format.

(3) A copy item. When the code decides to use a copy item it also decides on an optimal length & offset for the copy item.

The decision is based on minimum cost of representing the data.

(a) When exploring the copy item possibility the code first finds the best possible copy item for the current position. The best possible copy item is the item that produces the maximum gain. The gain is defined as the literalCost—copyCost. The literalCost is the total cost of representing the string as a sequence of literal items. The copyCost is the cost of representing the string as a copy item. The code queries the adaptive Huffman trees for the actual representation cost when computing this gain, which is called gain1.

(b) Next, if the previous gain1 is greater than zero then the code explores the gain that would result if it sent the current byte as a literal byte, and then did the best possible copy item on the next byte. This gain is called gain2. If gain2 is greater than gain1 then the current byte will be sent as a literal item. This is different from normal "greedy" behavior in an LZ77 based compressor. Also note that the next byte will undergo the same evaluation, so that it is possible that more than one byte will be sent in sequence as literals, even though one could have used copy items.

(c) However, if after paragraph (b) one is still considering a copy item AND the length from the gain1 computation is greater than 3 the code explores the effects of cutting back the length in the gain1 computation by one byte. The costPerByteA is the representation cost per byte for the two consecutive copy items if the normal decision resulting in gain1 is taken. The costPerByteB is the representation cost per byte for the two consecutive copy items if one cuts back the length of the first copy item by one byte. If costPerByteB is less than costPerByteA then the length of the copy item is cut back by one byte.

(d) Finally, if the code is still contemplating a copy item decision and the length of the best copy item is two bytes and one would be able to use a single byte copy from 2 bytes back combined with a single literal item, then this cost is computed. If this cost is lower, then a normal copy item is not produced. The code does check for both a single byte copy, followed by a literal item, and a literal item followed by a single byte copy.

Figure 4:
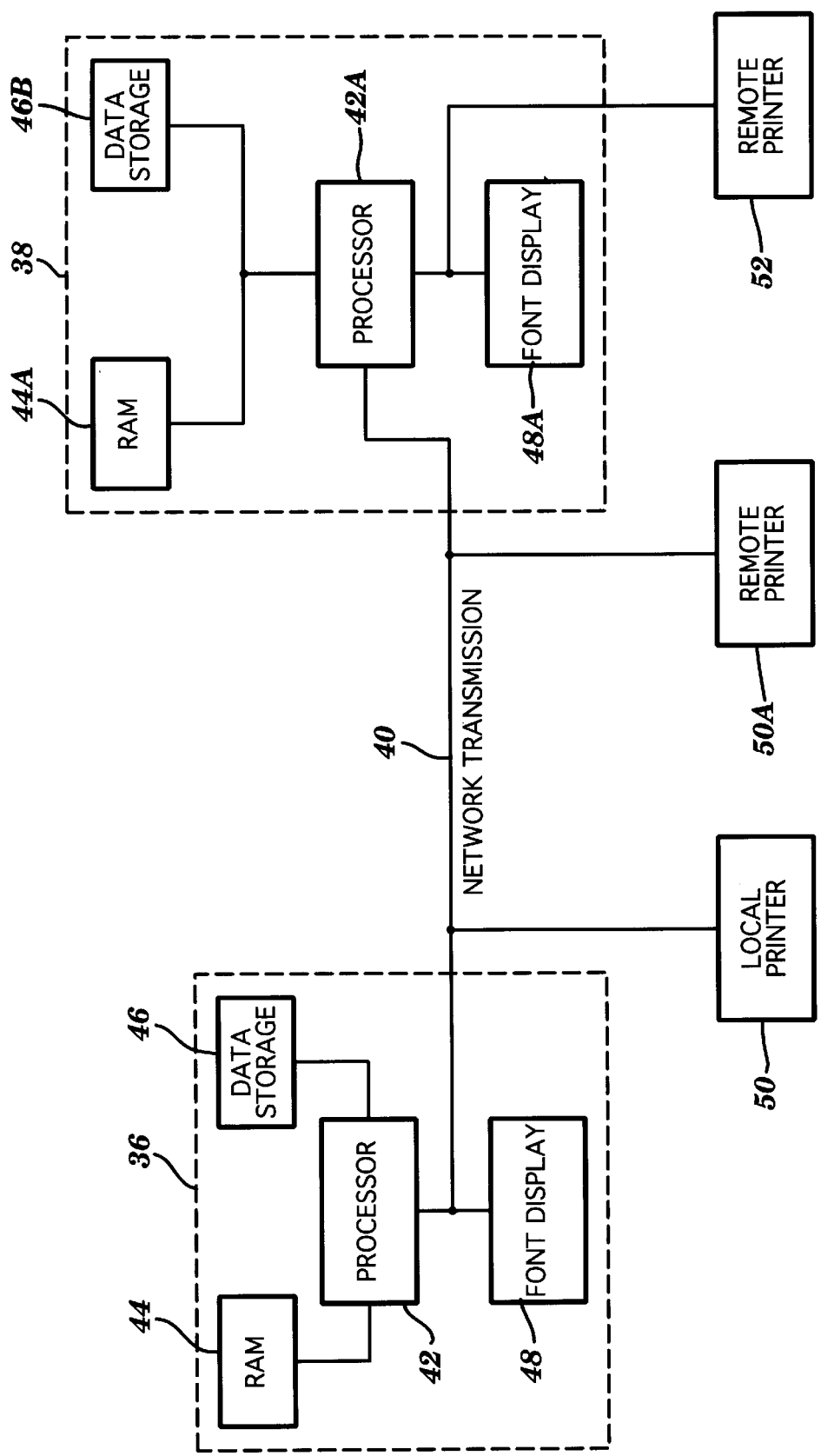

FIG. 4 illustrates in block diagram form a network embodiment with compression and decompression processing occurring at separate locations 36 and 38, respectively, that are connected by a communication channel 40 such as the Internet. It will be appreciated that communication channel 40 can be wired, wireless or a combination thereof.

The compression location or station 36 contains a processor 42 with associated RAM 44 and data storage 46. Station 36 can represent a web server connected to a plurality of local and/or remote devices. Fonts can be displayed on font display 48 and hard copy produced at a local printer 50. Compressed font data can be sent to one or more of the plurality of local and/or remote devices at corresponding local and/or remote locations. If desired, decompression can be performed at location 36 as well as compression or compressed data can be storted on the data storage 46 for subsequent delivery to another location or locations.

The compressed representation of the TrueType font file is transmitted over communication channel 40 to decompression location 38. It should be noted that the compressed representation can be sent as part of a document so that the original design, layout and typography can be duplicated at location 38 after decompression. Similar remote station components 42A, 44A, 46A, 48A and 50A correspond to the processor, RAM, data storage, font display and printer at location 36. Decompression station 38 can have its own printer 52 and the decompression facility can be provided in this printer or in any other remote device connected to station 36. Furthermore, the compressed representation of the original TrueType font file can be stored in the printer itself.

Having described in detail a preferred embodiment of our invention, it will now be apparent those in the art that numerous modifications can be made without departing from the invention as defined in the following claims:

We claim:

1. A method for font compression comprising:

compressing different components of a font file with separate compressors having varying compression schemes to produce a plurality of intermediate compressed data sets;

separating compressed glyph table components of said different components of the font file into different ones of said plurality of intermediate compressed data sets; and further compressing said plurality of intermediate compressed data sets to produce a corresponding plurality of compressed output data sets.

2. The method of claim 1 further comprising the step of merging said plurality of compressed output data sets to produce a single compressed output font file.

3. The method of claim 1 wherein said font file represents TrueType font.

4. The method of claim 1 wherein bit map identity of the font file is maintained during compression.

5. The method of claim 1 wherein compressing different components includes maintaining byte alignment of said compressed components.

6. A method for producing a compressed representation of a TrueType font file comprising a table directory, and loca, cvt, hdmx, VDMX, hmtx and glyph tables, said method comprising:

(A) compressing, with separate compressors, each of the loca, cvt, hdmx, VDMX, hmtx and a first portion of the glyph tables to produce a first intermediate compressed data set;

(B) compressing a second portion of the glyph table to produce a second intermediate compressed data set;

(C) compressing a third portion of the glyph table to produce a third intermediate compressed data set;

(D) updating the font table directory; and, (E) separately compressing the first, second and third intermediate compressed data sets to produce corresponding output data sets that collectively represent the TrueType font file.

7. The method of claim 6 further comprising maintaining bit map identity between the TrueType font file and the output data sets.

8. The method of claim 6 further comprising maintaining byte alignment of at least one of the tables other than the hdmx and VDMX tables during step (A).

9. A method for font decompression comprising:

providing a plurality of compressed output data sets each containing portions of compressed glyph table components corresponding to a font file;

decompressing, in separate decompressors, said plurality of compressed output data sets to produce a corresponding plurality of intermediate compressed data sets; and decompressing said plurality of intermediate compressed data sets to produce said font file.

10. The method of claim 9 further comprising maintaining bit map identity between the compressed output data sets and the font file.

11. A method for producing a compressed representation of a TrueType font file at a first location and for decompressing at least a portion of the compressed representation at a second location, said method comprising:

compressing different components of the TrueType font file, with separate compressors having different compression schemes, to produce a plurality of intermediate compressed data sets;

further compressing the intermediate compressed data sets to produce twice compressed data sets corresponding to the plurality of intermediate compressed data sets;

combining said twice compressed data sets into a single compressed representation of the TrueType font file at the first location;

transmitting the compressed representation of the TrueType font file over a communications channel to the second location; and, decompressing at the second location said compressed representation of the TrueType font file to produce a decompressed output font file having functional equivalency with said TrueType font file.

12. The method of claim 11 wherein said decompressed output font file, said compressed representation of the TrueType font file, and the TrueType font file each have bit map identity.

13. The method of claim 11 wherein byte alignment exists between said decompressed output font file, said compressed representation of the TrueType font file, and the TrueType font file.

14. A method for compressing TrueType font (TTF) data represented as a predetermined number of tables including a glyph table, the method comprising:

generating compressed TrueType font (CTF) data by separately processing each of the tables using a different compression scheme for each table;

moving the CTF data other than glyph table represented data into one of a multitude of CTF data groups;

transferring and distributing the CTF data representing the glyph table into the multitude of CTF data groups;

producing compressed data sets by separately processing each CTF data group; and providing final compressed TrueType font data by combining the compressed data sets.

15. The method of claim 14, where one of the compression schemes of generating compressed TrueType font (CTF) data passes data with zero compression.

16. The method of claim 14, wherein transferring and distributing the CTF data further comprises transferring data from the glyph table, of initial push bursts for each glyph, to a first of the CTF data groups.

17. The method of claim 15, wherein moving the CTF data further comprises moving data of instructions from the glyph table, for glyphs minus concatenation of initial push bursts of the glyphs, to a second of the CTF groups.

18. A system for compressing TrueType font (TTF) data represented as a predetermined number of tables including a glyph table, the system comprising:

multiple first level font compressors for generating compressed TrueType font (CTF) data by separately processing each of the tables using a different compression scheme for each table;

a first memory area for storing the CTF data representing the glyph table into a multitude of CTF data groups;

a second memory area for storing the CTF data other than glyph table represented data into one of the CTF data groups;

multiple second level font compressors for producing compressed data sets by separately processing each CTF data group; and a multiplexor for combining the compressed data sets to provide a final compressed TrueType font data set.

19. The system of claim 18 where one of the multiple first level font compressors passes data with zero compression.

20. The system of claim 18 where one section of the first memory area stores glyph data of initial push bursts for each glyph.

21. The system of claim 20, where another section of the first memory area stores instructions from the glyph table, for glyphs minus concatenation of initial push bursts of the glyphs.

22. A system for decompressing a compressed representation of a TrueType font file comprising three merged compressed data sets with the first data set containing an updated table directory and twice compressed tables cvt, hdmx and VDMX and with the second and third data sets containing twice compressed glyph data and glyph code, respectively, said system comprising:

means for splitting the merged three data sets into individual compressed first, second and third data sets;

means for decompressing said individual compressed first, second and third data sets to produce intermediate compressed first, second and third data sets;

means for further decompressing said intermediate compressed first data set to produce a TrueType table directory, tables cvt, hdmx and VDMX and glyph outlines;

means for further decompressing said intermediate compressed second and third data sets to produce a glyph table; and means for rebuilding a TrueType loca table with said table directory and tables representing the TrueType font file.

23. The method of claim 6, further comprising multiplexing the output data sets into a single compressed data set.

24. The method of claim 9 wherein byte alignment of components of the font file is maintained during decompression.

25. A method for decompressing a compressed representation of a TrueType font file comprising three merged compressed data sets with the first data set containing an updated table directory and twice compressed tables cvt, hdmx and VDMX and with the second and third data sets containing twice compressed glyph data and glyph code, respectively, said method comprising:

splitting the merged three data sets into individual compressed first, second and third data sets;

decompressing said individual compressed first, second and third data sets to produce intermediate compressed first, second and third data sets;

further decompressing said intermediate compressed first data set to produce a TrueType table directory, tables cvt, hdmx and VDMX and glyph outlines;

further decompressing said intermediate compressed second and third data sets to produce a glyph table; and rebuilding a TrueType loca table with said table directory and tables representing the TrueType font file.

* * * * *